A. ALLAN.
VEHICLE SHOE.
APPLICATION FILED NOV. 18, 1912.

1,095,768.  Patented May 5, 1914.

Witnesses
G. B. Roxburgh
W. Wakefield

Inventor
A. Allan

By
Fred B. Featherstonhaugh
atty

UNITED STATES PATENT OFFICE.

ALBERT ALLAN, OF EDMONTON, ALBERTA, CANADA.

VEHICLE-SHOE.

1,095,768.  Specification of Letters Patent.  Patented May 5, 1914.

Application filed November 18, 1912. Serial No. 732,138.

*To all whom it may concern:*

Be it known that I, ALBERT ALLAN, of the city of Edmonton, in the Province of Alberta, Canada, have invented certain new and useful Improvements in Vehicle-Shoes, of which the following is the specification.

My invention relates to shoes attachable to vehicle wheels, and the object of the invention is to provide a simple, inexpensive, and durable device which, when applied, will allow a vehicle to extract itself, when stalled on account of the wheels slipping, and it consists essentially in a set of curved metallic bars releasably secured to the vehicle wheels, and a cross rod connecting the bars, the parts being arranged and constructed as hereinafter more particularly described.

Figure 1:
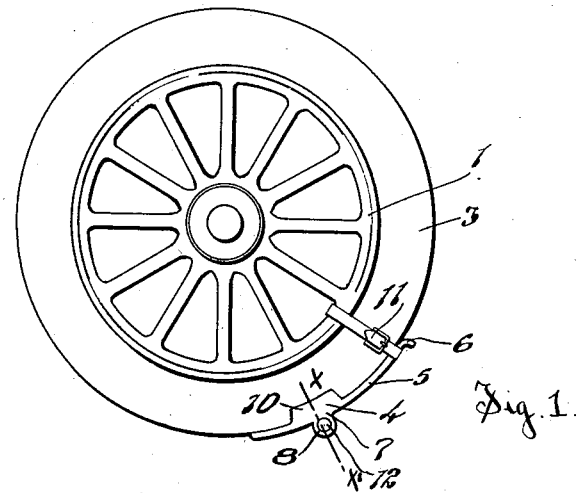
Figure 2:
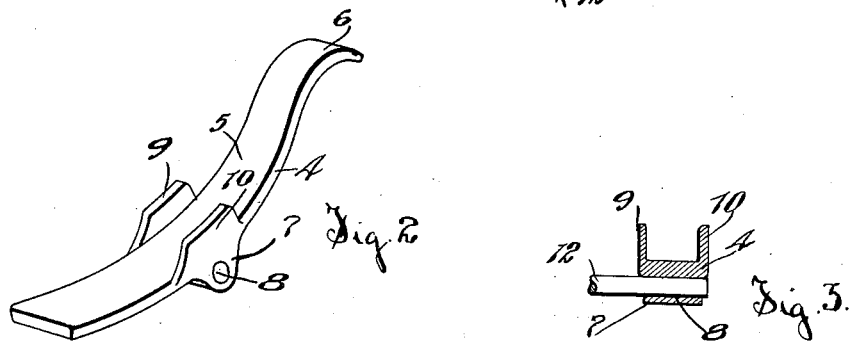
Figure 3:
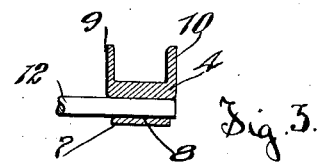
Figure 4:
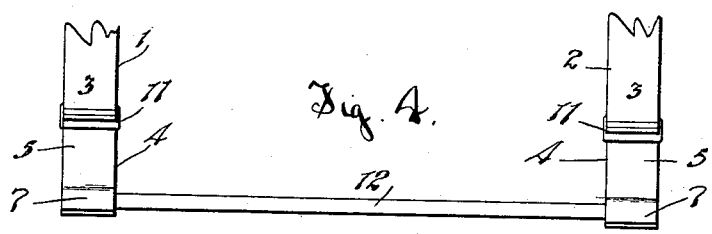

Figure 1 is a side elevation of a wheel with my device attached. Fig. 2 is a perspective view of one of the shoes. Fig. 3 is a cross sectional view through the shoe, the section being taken at the point denoted by the line X X', Fig. 1. Fig. 4 is a front elevation of a pair of shoes as they appear when secured on the wheels of the vehicle.

In the drawing like characters of reference indicate corresponding parts in each figure.

1 and 2 represent power driven vehicle wheels, such as the drive wheels of automobiles, supplied with the usual tires 3.

4 represents my shoe which is applied to each vehicle wheel in a manner later disclosed. Each shoe is formed from a bar 5 having the body portion curved to fit the adjoining portion of the vehicle tire and having the front end turned outwardly at 6. The body of the bar is enlarged at 7 and provided with a cross opening 8, and two opposing lugs 9 and 10 extend upwardly from the face of the bar and are adapted to receive the tire, thereby preventing the bar from shifting sidewise.

In actual practice if a vehicle be stalled two of my shoes are applied on the tires with the lower ends thereof shoved as far down beneath the tires as it is possible to get them, the upper ends being secured to the wheels by straps 11 or other suitable fastening means. A rod 12 can be inserted between the shoes with the ends in the openings 8 either before or after the shoes are applied on the wheel as may be most convenient. Upon the wheels being turned the vehicle will extricate itself as the wheels will climb on the shoes and ride over them, the rod holding the shoes from slipping in the ground.

In the above description it is to be understood that the shoes are used in connection with motor or steam driven vehicles, such as automobiles, traction engines, and such like machine.

What I claim as my invention is:

1. The combination with the drive wheels of a vehicle, of a rod passing across beneath the wheels and in advance of the points of contact of the wheels on the ground, means releasably secured to the ends of the rod and means for releasably connecting said first mentioned means to the tires of the wheels, as and for the purpose specified.

2. The combination with the drive wheels of a vehicle, of a rod passing across beneath the wheels and in advance of the points of contact of the wheels on the ground, means releasably receiving the ends of the rod and means engaging said first mentioned means and releasably securing said first mentioned means and rod to the tires of the vehicle, as and for the purpose specified.

3. The combination with the drive wheels of a vehicle, of a shoe curved to fit the tires of each drive wheel and applied to the same in advance of the points of contact of the wheels with the ground, said shoes each having an enlarged portion and provided with cross openings, a rod connecting the shoes and having the ends thereof received within the openings aforesaid, and means for releasably fastening the forward or upper ends of each shoe to the tires of the wheels, as and for the purpose specified.

4. The combination with the drive wheels of a vehicle, of a shoe bearing on the tire of each wheel in advance of the points of contact between the tire and the ground, said shoes having the body portions thereof bent to fit the tires and the upper ends turned outwardly, and being provided further with downwardly extending enlargements fitted with cross openings and upwardly extending lugs fitting the sides of the tire, a cross rod connecting the shoes and having the ends received within the cross openings aforesaid, and straps releasably securing the upper ends of the shoes to the tires of the wheels, as and for the purpose specified.

Signed at Edmonton this 19th day of August 1911.

ALBERT ALLAN.

In the presence of—
WM. SHORT,
LENA BAIN.

---

Copies of this patent may be obtained for five cents each, by addressing the " Commissioner of Patents, Washington, D. C."